May 15, 1951  E. A. EPPS, JR., ET AL  2,553,407
PURIFYING SULFURIC ACID
Filed June 22, 1946
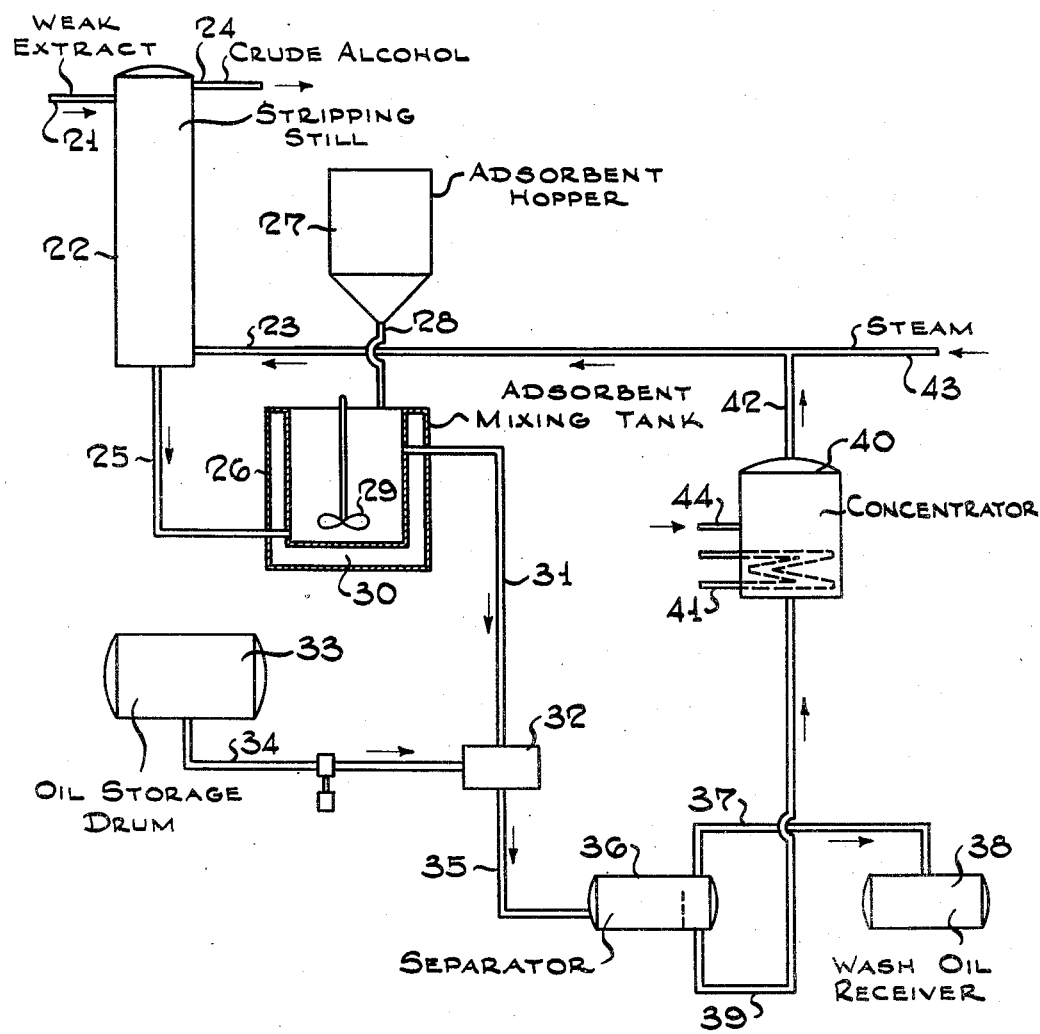
Ernest A. Epps, Jr.
Bowman S. Garrett  Inventors
By _____ Attorney Patented May 15, 1951

2,553,407

UNITED STATES PATENT OFFICE 2,553,407

PURIFYING SULFURIC ACID

Ernest A. Epps, Jr., Baton Rouge, La., and Bowman S. Garrett, Bellerose, N. Y., assignors to Standard Oil Development Company, a corporation of Delaware Application June 22, 1946, Serial No. 678,640

3 Claims. (Cl. 23—173)

This invention relates to the purification of sulfuric acid and more particularly relates to the recovery of mineral acids used in the refining of mineral oils.

It is well known in the art to refine mineral oils utilizing various inorganic acids. For example, it is known to remove sulfur compounds and various other deleterious substances from petroleum fractions, particularly those fractions boiling in the motor fuel boiling range, by treating the same with sulfuric acids of various concentrations. It is also known to produce various products, as for example, alcohols, esters, and ethers from olefins utilizing sulfuric acid as a reagent. These processes are commercially justified to a large extent upon the efficiency and the cost of regenerating the various reagents, particularly the sulfuric acid.

For example, in the manufacture of alcohols from unsaturated hydrocarbons by the use of strong sulfuric acid, a small portion of the unsaturated hydrocarbons is converted to materials which form tars and free carbon when subjected to the high temperatures needed to separate the crude alcohol from the acid. The tar must be removed to make the acid reconcentration equipment operable. If the removal is not complete before the acid is reconcentrated to high strength, the heat then applied causes the acid-soluble material to be decomposed to elemental carbon, which may appear in the concentrated acid as a filterable free carbon or as colloidal carbon. When unsaturated hydrocarbons are esterified with restored sulfuric acid, any carbon colloid present is gradually precipitated. On dilution of the ester acid extract, the carbon colloid is completely precipitated. A diluted acid extract will contain sufficient quantities of free carbon and resinous materials to lower the efficiency of operation of any subsequent piece of equipment for alcohol or acid recovery. The greatest reduction in efficiency to be expected would be in the acid restoration equipment, through fouling by free carbon. In the past, the separation of tar and carbon has been done by settling in large tanks, and at times by centrifuging. Removal of the less highly polymerized carbonaceous materials by pressure distillation has been attempted. It has also been the practice to bleach the restored acid to remove substantially all elemental and organic carbon prior to use for olefin absorption.

The disadvantages inherent in each of these methods of carbon reduction can be listed as follows:

(1) Bleaching requires the use of alloys resistant to nitric and strong sulfuric acid at high temperatures. The excess nitric acid remaining after bleaching must be removed by the use of ammonia which reacts with the sulfuric acid to form undesirable salts such as ammonium sulfate. In periods of national emergency the difficulty in obtaining and the cost of nitric acid are additional factors to be considered.

(2) Pressure distillation of the weak spent acid on a continuous commercial scale presents operation conditions requiring pumps and lines chemically resistant to hot weak sulfuric acid and having high mechanical strength at elevated temperature and pressure. The difficulty in overcoming these conditions to the extent necessary for commercial application constitutes a strong objection to its use. Furthermore, suspended carbon is not satisfactorily removed by this process.

(3) Mechanical filtration of the suspended carbon in the weak acid requires special equipment and because of the critical nature of the operation places a heavy demand on operating personnel. For use in a continuous process the operation of two filters set up in parallel is essential so that no interruption of the process would result when washing becomes necessary. Furthermore, corrosion of equipment makes repairs and upkeep costly.

(4) In the oil flotation process, dispersed insoluble carbon is wetted with oil and separated by settling. Soluble carbonaceous material is not removed by this method.

It is, therefore, the main object of this invention to provide a more efficient process for the removal of suspended elemental carbon particles and small quantities of tars and resins from spent sulfuric acid.

It is another object of this invention to prevent the buildup of free carbon in reconcentrated sulfuric acid to be recycled in a process for the manufacture of alcohols by the sulfation of olefins.

Further objects of this invention will be apparent from the following specification when considered together with the accompanying drawing which is a schematic view in elevation of the application of the invention to the removal of free carbon and tars from spent sulfuric acid used in the manufacture of isopropyl alcohol.

These and other objects of this invention are accomplished by intimately mixing the spent sulfuric acid with a solid absorbent and washing the mixture with an oil non-reactive with the acid.

The solid adsorbent removes soluble impurities from the acid while the oil removes the adsorbent and all extraneous suspended materials. While the process is applicable to the removal of soluble and suspended carbon from any type of spent sulfuric acid it is particularly applicable to the spent acid recovered in the manufacture of alcohols from olefins. Such residual acid may contain free carbon as well as organic material such as polymers, etc. which carbonize to form free carbon when the acid is reconcentrated. In such processes an olefinic gas is treated with sulfuric acid of suitable strength for the olefin desired to be absorbed. The olefin esters thus formed are hydrolyzed with water and steam distilled to recover the alcohol. The acid is recovered as still bottoms which, after a single concentration to absorption strength, contains elemental carbon and soluble organic material. According to the invention the still bottoms are agitated with a solid adsorbent for a short time, heated, and the mixture finally treated with an oil to remove both adsorbent and solid carbon. The acid so treated may then be concentrated to an acid of absorption strength substantially free of elemental and soluble carbon.

Suitable adsorbents include clays of all types such as fuller's earth, Attapulgus clay, montmorillonite, etc., silica gel, alumina, bauxite, animal charcoal, activated vegetable charcoal, etc.

The oil used consists of any hydrocarbon oil stable toward the sulfuric acid at temperatures near the boiling point of the hydrocarbon and the acid at atmospheric pressure. In most cases it is preferable to wash the acid as it flows from the still, and under such conditions, petroleum distillates in the kerosene or gas oil range are most effective. Petroleum oils of higher boiling points such as light lubricating oil fractions or their phenolic extracts can also be used.

The amount of the hydrocarbon used is determined by the condition of the acid but in general it is found that an amount of oil equivalent to 1 to 25 volume per cent of the weak acid washed is generally sufficient, the settling time decreasing with increased amounts of oil. For example when using 1 gallon of a 26 API gravity oil per 100 gallons of acid, 90% of the acid can be settled free of suspended carbon in 15 minutes, 95% in one hour and 98% to 99% in 24 hours.

In general the process is carried out in the following manner.

The acid is preferably mixed with a solid adsorbent in a tank or other suitable mixing vessel provided with a stirrer for mixing and a steam jacket or other means for heating. Oil is then added to this mixture in an orifice mixer or other suitable intimate mixing equipment and then flowed to a separator where the oil and adsorbent plus other solid matter, such as carbon settle out. The acid is taken off the bottom of the separator clear, ready for storage, or concentration. The oil-adsorbent layer is sent to a tank for separation of the adsorbent by settling or filtration or the mixture is burned as fuel.

The drawing is a schematic view in elevation of the application of the invention to the removal of free carbon from spent sulfuric acid used in the manufacture of isopropyl alcohol.

Referring now to the drawing, a sulfuric acid extract of about 45% concentration, containing hydrolyzed alkyl sulfates obtained by adsorbing olefins from a $C_3$ hydrocarbon fraction in sulfuric acid of suitable concentration and subsequently diluting with water to an acid strength of 45%, calculated on a hydrocarbon and alcohol-free basis, is introduced into column 22 through line 21 at a temperature of about 75° C. This column may be either a packed column or a plate column. The acid extract flows down through the column countercurrent to a stripping medium introduced at the bottom of tower 22 through line 23. In this manner isopropyl alcohol is stripped from the weak acid extract and removed from the top of column 22 through line 24 and sent to storage. Acid extract is removed from the bottom of column 22 through line 25 and introduced into tank 26.

An adsorbent, such as bleaching earth, is added to the acid in tank 26 from hopper 27 by line 28. Tank 26 is provided with a stirrer 29 to ensure thorough mixing of the acid and adsorbent. A steam jacket 30 is also provided on tank 26 to raise the temperature, if desired. The mixture of adsorbent and oil is removed from tank 26 by line 31 and passed to orifice mixer 32 where it contacts oil introduced from storage tank 33 by line 34.

The mixture of acid adsorbent and oil is passed through line 35 into separator 36 where it is permitted to settle for a period of time sufficient to allow the major portion of the adsorbent and other solid material in the acid to be removed along with the oil. At the end of the settling time the oil containing the suspended adsorbent is removed through line 37 and stored in tank 38. Sulfuric acid substantially free from suspended carbon is removed from separator 36 through line 39 and introduced into reboiler 40 which is heated by indirect heat exchange with diphenyl vapor in coil 41. In this manner the acid is concentrated. Steam and remaining volatile polymers are removed through line 42 and introduced into stripper 22 through line 23 as at least a portion of the stripping medium therein. Additional steam may be introduced through line 43. Reconcentrated acid of about 70% is withdrawn from reboiler 40 through line 44.

In the above description an acid extract of about 45% concentration containing alkyl sulfates obtained by absorbing a $C_4$ cut in sulfuric acid of about 90% to 95% may be introduced into stripper 22 of the drawing at a temperature of 75° C. instead of the acid extract from a $C_3$ cut. Butyl alcohol would then be taken overhead through line 24. Similarly other acid extracts could be employed.

From the above description it is clear that a process has been found whereby the detrimental effects on acid flow through restoring or stripping equipment due to the presence of suspended elemental carbon and tars and resins present in spent sulfuric acid, from the preparation of alcohols, has been overcome by mixing an adsorbent with the spent acid and subsequently settling to recover sulfuric acid substantially free from suspended elemental carbon.

*Example*

200 cc. isopropanol generator bottoms was contacted with 10 grams of a powdered adsorbent. The mixture was shaken well and heated to 95° C. for ten minutes. No. 6 gas oil (20 cc.) was added to the treated acid, in order to remove both adsorbent and impurities in the hydrocarbon phase. The untreated acid contained 0.9% carbon. This figure was reduced to 0.6% when charcoal was the adsorbent and to 0.7% when clay was used.

While the above process has been described in connection with the recovery of suspended elemental carbon from spent sulfuric acid obtained in the manufacture of isopropyl alcohol, this is by way of illustration only, and it is not intended to be limited since the process is applicable to the recovery of such elemental and soluble carbon from any type of spent acid obtained in the manufacture of any type of alcohol or from any other desired source.

The nature and objects of the present invention having thus been set forth and specific examples of the same given what is claimed as new and useful and desired to be secured by Letters Patent is:

1. A process for purifying a dilute aqueous sulfuric acid obtained in stripping alcohol from a hydrolyzed olefin-sulfuric acid extract, said dilute aqueous sulfuric acid having present as impurities small amounts of carbonaceous materials dissolved and suspended therein, said impurities being formed in the manufacture of the alcohol by sulfating an olefin in the acid to form the extract, then diluting the extract with water to hydrolyze the sulfated olefin therein, which comprises the steps of admixing a powdered adsorbent with said dilute aqueous sulfuric acid, adsorbing said dissolved carbonaceous impurities by said powdered adsorbent in the dilute acid, admixing the resulting dilute acid containing the impurities adsorbed by the powdered adsorbent with a hydrocarbon oil that is stable to the acid and substantially consists of hydrocarbons that boil in the kerosene to light lubricating oil boiling range, settling the resulting mixture into a dilute aqueous sulfuric acid phase freed of said impurities and a hydrocarbon oil phase containing the adsorbent having the carbonaceous impurities adsorbed thereon, and separating said phases, the dilute acid being maintained out of contact with other sulfuric acid treated organic substances during these steps so that the acid is not further contaminated.

2. The process according to claim 1 in which the powdered solid adsorbent admixed is charcoal.

3. The process according to claim 1 in which the powdered solid adsorbent admixed is clay.

ERNEST A. EPPS, JR.
BOWMAN S. GARRETT.

REFERENCES CITED

The following references are of record in the file of this patent:

UNITED STATES PATENTS

| Number | Name | Date |
|---|---|---|
| 1,092,386 | Pau | Apr. 7, 1914 |
| 1,665,189 | Roth | Apr. 3, 1928 |
| 1,960,348 | Pongratz | May 29, 1934 |
| 2,066,933 | Gard | Jan. 5, 1937 |
| 2,079,424 | Read | May 4, 1937 |
| 2,304,280 | Read | Dec. 8, 1942 |
| 2,343,791 | O'Dell | Mar. 7, 1944 |

FOREIGN PATENTS

| Number | Country | Date |
|---|---|---|
| 363,205 | Great Britain | Dec. 17, 1931 |